US009325032B2

(12) United States Patent
Park et al.

(10) Patent No.: US 9,325,032 B2
(45) Date of Patent: Apr. 26, 2016

(54) ELECTRODE ASSEMBLY, BATTERY AND DEVICE INCLUDING THE SAME

(71) Applicant: LG Chem, Ltd., Seoul (KR)

(72) Inventors: Hyun Park, Daejeon (KR); In-Gu An, Daejeon (KR); Dong-Myung Kim, Daejeon (KR); Jae-Bin Chung, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/497,542

(22) Filed: Sep. 26, 2014

(65) Prior Publication Data

US 2015/0010800 A1    Jan. 8, 2015

Related U.S. Application Data

(63) Continuation of application No. PCT/KR2014/006120, filed on Jul. 8, 2014.

(30) Foreign Application Priority Data

Jul. 8, 2013    (KR) .................. 10-2013-0079786
Jul. 8, 2014    (KR) .................. 10-2014-0085340

(51) Int. Cl.
*H01M 4/02* (2006.01)
*H01M 10/0525* (2010.01)
(Continued)

(52) U.S. Cl.
CPC ........ *H01M 10/0525* (2013.01); *H01M 2/0202* (2013.01); *H01M 2/0237* (2013.01); *H01M 4/13* (2013.01); *H01M 10/0463* (2013.01); *H01M 10/0565* (2013.01); *H01M 10/0585* (2013.01); *H01M 2/22* (2013.01); *H01M 10/0413* (2013.01); *H01M 10/0431* (2013.01); *H01M 10/0436* (2013.01); *H01M 10/0587* (2013.01); *H01M 2002/0205* (2013.01); *H01M 2220/20* (2013.01);

(Continued)

(58) Field of Classification Search
None
See application file for complete search history.

(56) References Cited

U.S. PATENT DOCUMENTS 6,224,995 B1    5/2001    Fauteux et al.
2001/0005561 A1    6/2001    Yamada et al.
(Continued)

FOREIGN PATENT DOCUMENTS

EP    2940776 A1    11/2015
JP    2001028275 A    1/2001
(Continued)

OTHER PUBLICATIONS

Machine translation of JP 2003-234094, retrieved from <https://www.j-platpat.inpit.go.jp/web/all/top/BTmTopEnglishPage> on Sep. 22, 2015.*

(Continued)

*Primary Examiner* — Cynthia K Walls
(74) *Attorney, Agent, or Firm* — Lerner, David, Littenberg, Krumholz & Mentlik, LLP

(57) ABSTRACT

The present disclosure relates to an electrode assembly formed by stacking a plurality of electrode units, the electrode assembly including: two or more steps formed by stacking three or more types of the electrode units having different areas, wherein an array of electrode units having a maximum area among the electrode units is positioned in the interior of the electrode assembly, and electrodes having different polarities face each other at an interface between the electrode units having different areas.

10 Claims, 3 Drawing Sheets

(51) Int. Cl.
   *H01M 2/02* (2006.01)
   *H01M 4/13* (2010.01)
   *H01M 10/0565* (2010.01)
   *H01M 10/0585* (2010.01)
   *H01M 2/22* (2006.01)
   *H01M 10/04* (2006.01)
   *H01M 10/0587* (2010.01)

(52) U.S. Cl.
   CPC .......... *H01M 2220/30* (2013.01); *Y02E 60/122* (2013.01)

(56) References Cited

U.S. PATENT DOCUMENTS

| | | |
|---|---|---|
| 2011/0287308 A1 | 11/2011 | Kim et al. |
| 2012/0015236 A1 | 1/2012 | Spare |
| 2013/0108906 A1 | 5/2013 | Bhardwaj et al. |
| 2014/0072850 A1 | 3/2014 | Kwon et al. |
| 2014/0205879 A1 | 7/2014 | Jang et al. |

FOREIGN PATENT DOCUMENTS

| | | | | |
|---|---|---|---|---|
| JP | 2001167743 A | 6/2001 | | |
| JP | 2003234094 A | 8/2003 | | |
| JP | 3680797 B2 | 8/2005 | | |
| JP | 2015513190 A | 4/2015 | | |
| JP | 2015513772 A | 5/2015 | | |
| KR | 20-0207948 Y1 | 1/2001 | | |
| KR | 2003-0066960 | * | 8/2003 | ............ H01M 10/12 |
| KR | 101191635 B1 | 10/2012 | | |
| KR | 20130051890 A | 5/2013 | | |
| WO | 2011094286 A2 | 8/2011 | | |
| WO | 2012/009423 A1 | 1/2012 | | |
| WO | 2013133632 A1 | 9/2013 | | |

OTHER PUBLICATIONS

Machine translation of KR 2003-0066940, retrieved from <http://kposd.kipo.go.kr:8088/up/kpion/> on Sep. 22, 2015.*

International Search Report for Application No. PCT/KR2014/006120 dated Oct. 13, 2014.

Written Opinion of the ISR for Application No. PCT/KR2014/006120 dated Oct. 13, 2014.

Extended search report from European Application No. 14766881.8, dated Feb. 17, 2016.

* cited by examiner

ELECTRODE ASSEMBLY, BATTERY AND DEVICE INCLUDING THE SAME

CROSS-REFERENCE TO RELATED APPLICATIONS

This application claims the priorities of Korean Patent Application Nos. 10-2013-0079786 filed on Jul. 8, 2013, 10-2014-0085340 filed on Jul. 8, 2014 in the Korean Intellectual Property Office and the international application No. PCT/KR2014/006120 filed on Jul. 8, 2014, the disclosures of which are incorporated herein by reference.

BACKGROUND OF THE INVENTION

1. Field of the Invention

The present disclosure relates to an electrode assembly, a battery and a device including the same, and more particularly, to an electrode assembly including a combination of three or more types of electrode units having different areas, electrodes having different polarities being formed to face each other at an interface between the electrode units having different areas, and a battery and a device including the same.

2. Description of the Related Art

With technical advancements and increasing demand for mobile devices, demand for rechargeable batteries has sharply increased. Among rechargeable batteries, lithium secondary batteries with high degrees of energy density and high operating voltages, as well as superior life cycles are widely used as energy sources for various electronic appliances as well as a variety of mobile devices.

Generally, a lithium secondary battery is formed to have a structure in which an electrode assembly and an electrolyte are sealed within a battery case, and may be classified as a cylindrical-type battery, a prismatic-type battery, a pouch-type battery, or the like according to the appearance thereof, or may be classified as a lithium ion battery, a lithium ion polymer battery, a lithium polymer battery, or the like, according to the type of electrolyte used therein. Due to the recent trend for the miniaturization of mobile devices, the demand for thin prismatic batteries and pouch-type batteries has increased, and particularly, interest in lightweight pouch-type batteries having easily alterable shapes is high.

The electrode assembly received in the battery case may be classified as a jelly-roll (wound)-type, a stacked (laminated)-type, and a stacked and folded (composite)-type according to the shape thereof. The jelly-roll-type electrode assembly is commonly manufactured by coating metal foil used as a current collector with an active electrode material, pressing the coated metal foil, cutting the pressed metal foil into a band having a desired length and width, separating a negative electrode sheet and a positive electrode sheet using a separator film, and winding the negative and positive electrode sheets and the separator film in a spiral form. The stacked-type electrode assembly is an electrode assembly, manufactured in a manner in which a negative electrode, a separator, and a positive electrode are vertically stacked. Meanwhile, the stacked and folded-type electrode assembly is an electrode assembly, manufactured by winding or folding a single electrode or stacked electrode bodies respectively formed of a negative electrode, a separator, and a positive electrode using a long sheet-type separator.

However, since electrode assemblies according to the related art known up to date may be generally manufactured by stacking unit cells or individual electrodes having the same size, a degree of freedom in the shape thereof may be deteriorated, resulting in limitations in the design thereof. Meanwhile, in order to modify the design, in the majority of cases, complex and difficult processes may be required at the time of manufacturing, stacking or electrically connecting the individual electrodes. In the case of modifying the design, battery capacity per volume may be degraded.

Therefore, the development of an electrode assembly capable of being variously designed while having stability and high capacity characteristics and a battery using the electrode assembly has been demanded.

An exemplary embodiment of the present disclosure may provide an electrode assembly capable of being variously designed as compared to the related art and allowing for a significant decrease in non-utilized space due to design factors to increase space occupancy by using a combination of three or more types of electrode units having different areas, as well as having superior stability by including an electrode unit having the maximum area in the interior of the combination of the electrode units, a battery and a device including the same.

SUMMARY OF THE INVENTION

According to an aspect of the present disclosure, there is provided an electrode assembly formed by stacking a plurality of electrode units, the electrode assembly including: two or more steps formed by stacking three or more types of the electrode units having different areas, wherein an array of electrode units having a maximum area among the electrode units is positioned in the interior of the electrode assembly, and electrodes having different polarities face each other at an interface between the electrode units having different areas.

Each of the electrode units may be formed of a single electrode, a unit cell including a positive electrode and a negative electrode with a separation film interposed therebetween, or a combination thereof.

The unit cell may be manufactured by a jelly-roll method, a stacking method, a stacking and folding method or a lamination and stacking method.

In each of the electrode units, an electrode surface thereof may have a quadrangular shape in which at least one corner is curved or at least one side is curved.

At least one of the three or more types of the electrode units may have an electrode surface shape different from that of a remainder thereof.

According to another aspect of the present disclosure, there is provided a secondary battery including the electrode assembly described above, embedded in a battery case.

The secondary battery may be a lithium ion secondary battery or a lithium ion polymer secondary battery.

According to another aspect of the present disclosure, there is provided a battery package including two or more secondary batteries described above.

According to another aspect of the present disclosure, there is provided a device including at least one secondary battery. The device may be a mobile phone, a portable computer, a smartphone, a smartpad, a netbook, a light electric vehicle (LEV), an electric vehicle, a hybrid electric vehicle, a plug-in hybrid electric vehicle, or a power storage device.

An exemplary embodiment of the present disclosure may provide an electrode assembly capable of being variously designed as compared to the related art and allowing for a significant decrease in non-utilized space due to design factors to increase space occupancy by using a combination of three or more types of electrode units having different areas, as well as having superior stability by including an electrode unit having the maximum area in the interior of the combination of the electrode units, a battery and a device including the same.

DETAILED DESCRIPTION OF THE INVENTION

Figure 1:
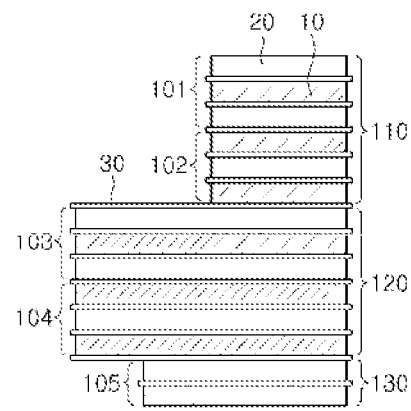
FIG. 1 is a side view of an electrode assembly according to an exemplary embodiment of the present disclosure.

Hereinafter, exemplary embodiments of the present disclosure will now be described in detail with reference to the accompanying drawings. However, the accompanying drawings may be provided to help the understanding of the present disclosure and be illustrated by way of example, but are not intended to limit the scope of the disclosure. In addition, like reference numerals refer to like elements throughout the drawings and some of elements may be exaggerated, scaled down, or omitted for clarity of illustration.

An exemplary embodiment of the present disclosure relates to an electrode assembly including a combination of three or more types of electrode units having different areas. In this case, the electrode units may be stacked so as to have steps formed therebetween while an electrode unit having the maximum area may be provided in the interior of the combination of the electrode units, and electrodes having different polarities may be formed to face each other at interfaces between the electrode units having different areas.

Here, the term "area" refers to a surface area of the electrode units in a direction (hereinafter, referred to as 'a plane direction') perpendicular with respect to a stacking direction of the electrode units, and the same type of electrode units may have the same shape and the same surface area.

In addition, the 'electrode unit', a basic unit configuring the electrode assembly, may be a single electrode such as a negative electrode or a positive electrode or may be a unit cell having a negative electrode and a positive electrode alternately stacked with a separation film interposed therebetween. In this case, the unit cell may be formed by stacking a single negative electrode and a single positive electrode with a separation film interposed therebetween or may also be formed by stacking two or more negative electrodes and two or more positive electrodes with a separation film interposed therebetween. Further, the 'electrode unit' may be formed of a combination of the unit cell and a single electrode.

Meanwhile, the term 'unit cell' is not particularly limited, as long as at least one negative electrode and at least one positive electrode are alternately stacked with a separation film interposed therebetween to cause a cell reaction. In the electrode assembly having steps according to an exemplary embodiment of the present disclosure, the unit cell may form a single layer or may be a combination of two or more layers having a step therebetween.

In this case, the unit cell may be an electrode laminate manufactured by a jelly-roll method of interposing a sheet-shaped separation film between a sheet-shaped negative electrode and a sheet-shaped positive electrode and subsequently, rolling the film and electrodes. Alternatively, the unit cell may be a stacked-type electrode laminate formed by stacking two or more electrodes in such a manner that a negative electrode and a positive electrode are alternately and sequentially stacked, with a separate separation film inserted therebetween. In addition, the unit cell may be a stacked and folded-type electrode laminate having at least one negative electrode and at least one positive electrode alternately stacked with a long sheet-type separation film interposed therebetween by disposing two or more electrodes on the long sheet-type separation film in a predetermined order and then, folding the sheet-type separation film using the electrode units.

Further, the unit cell may be a laminated and stacked-type electrode laminate formed by alternately stacking at least one negative electrode and at least one positive electrode to form a laminate using a predetermined degree of adhesion. In this case, the laminated and stacked-type unit cell may have a structure in which two or more electrodes having different polarities are alternately stacked with a separation film interposed between the electrodes and another separation film is stacked and laminated on one outermost surface of the unit cell. For example, the unit cell may be an electrode laminate having a minimum unit structure of an electrode/a separation film/an electrode/a separation film or an electrode laminate formed by further laminating at least one electrode and at least one separation film on the minimum unit structure. In addition, the laminated and stacked-type unit cell may have a structure in which two or more electrodes having different polarities are alternately stacked with a separation film interposed between the electrodes and other separation films are respectively stacked and laminated on both outermost surfaces of the unit cell. For example, the unit cell may be an electrode laminate having a minimum unit structure of a separation film/an electrode/a separation film/an electrode/a separation film or an electrode laminate formed by further laminating at least one electrode and at least one separation film on the minimum unit structure. Of course, the unit cell may be an electrode laminate having a minimum unit structure of an electrode/a separation film/an electrode laminated therein.

In the unit cells according to an exemplary embodiment of the present disclosure, electrodes alternately stacked with a separation film interposed therebetween may be arranged in such a manner that electrodes having the same polarity are positioned on both surfaces of the electrode laminate configuring the unit cell, in a similar manner to the case of a positive electrode/a negative electrode/a positive electrode or a negative electrode/a positive electrode/a negative electrode, and may also be arranged in such a manner that electrodes having different polarities are positioned on both surfaces of the electrode laminate configuring the unit cell, in a similar manner to the case of a positive electrode/a negative electrode or a positive electrode/a negative electrode/a positive electrode/a negative electrode.

The electrode assembly according to an exemplary embodiment of the present disclosure may be an electrode assembly including three or more layers and having two or more steps by combining three or more types of electrode units having different areas. Therefore, the electrode assembly according to an exemplary embodiment of the present disclosure may be, for example, an electrode assembly having two or more steps through the stacking of three or more types of electrode laminates having different areas, by stacking electrode units having the same areas to form the respective electrode laminates and stacking the respective electrode laminates on one another. In this case, the electrode assembly may be formed by stacking the respective electrode laminates as described above. Alternatively, the electrode assembly may be formed by arranging the respective electrode laminates on a sheet-shaped separation film and rolling the sheet-shaped separation film. In this manner, the electrode assembly may be formed by various methods such as a stacking method, a stacking and folding method or combinations thereof.

In this case, in the electrode assembly provided according to an exemplary embodiment of the present disclosure, an electrode unit having the maximum area among the three or more types of electrode units may be positioned in the interior of the electrode assembly. The electrode unit having the maximum area may be included within the combination of the electrode units, whereby the center of gravity of the electrode assembly may be positioned in the interior of the combination of the electrode units to increase stability of the electrode assembly. Further, an electrode assembly having a step according to the related art may be formed in a monotonous manner. For example, only an electrode assembly formed to have a size decreased or increased in a stacking direction of electrodes is merely provided. Consequently, a degree of freedom in the shape of a secondary battery is remarkably degraded and further, in designing components of a device using such a secondary battery, there is a great amount of limitation such as the need to consider the shape of the secondary battery or the like. However, with the electrode assembly provided according to an exemplary embodiment of the present disclosure, a degree of freedom in the shape of the battery may be improved and the device may be further variously designed without restriction due to a shape of the electrode assembly.

In the specification, the three or more types of electrode units having different areas refer to a combination of electrode units stacked in an amount of three or more layers and having different areas. In this case, the respective electrode units may be the same kind of electrode units or different types of electrode units. Further, in an exemplary embodiment of the present disclosure, differences in areas between the electrode units are not particularly limited, as long as steps may be formed at the time of stacking the electrode units, and may be freely adjusted in consideration of a desired design of a battery and the like.

According to an exemplary embodiment of the present disclosure, in the three or more types of electrode units, electrode surfaces of the electrode units may have different areas. The differences in areas between the electrode units are not particularly limited, as long as steps may be formed by stacking the electrode units. Further, in the electrode assembly according to an exemplary embodiment of the present disclosure, thicknesses of the respective electrode units may be identical to or different from each other, but are not limited thereto. For example, in an exemplary embodiment of the present disclosure, an electrode unit having a relatively large area may be thinner or thicker than an electrode unit having a relatively small area. Further, thicknesses of the electrode laminates formed of the electrode units or combinations thereof may also be identical to or different from each other.

In the electrode assembly according to an exemplary embodiment of the present disclosure, when electrodes or electrode units having the same area are stacked, electrodes having different polarities may be disposed to face each other with a separation film interposed therebetween. Even in the case of forming steps by stacking the electrode laminates having different areas, the electrodes having different polarities may be disposed to face each other with a separation film interposed therebetween at interfaces between the electrode laminates having different areas. Accordingly, even at the interfaces at which the steps are formed, a cell reaction may be promoted, thereby leading to an increase in electrical capacity. In this case, the term "face" refers to being disposed to be opposed to each other. Unless explicitly described otherwise, the term "face" includes a concept in which two electrodes face each other with a separation film interposed therebetween.

More preferably, in the electrode assembly according to an exemplary embodiment of the present disclosure, in a case in which electrodes having different polarities face each other at an interface at which a step is formed through the stacking of electrode units having different areas, an electrode having a relatively large area may be disposed as a negative electrode and an electrode having a relatively small area may be disposed as a positive electrode. The electrodes having different polarities face each other as described above, whereby short-circuits of a battery due to crystallization of a lithium metal may be suppressed. Thus, limitations such as shortening of battery lifetime or degradation in stability of the battery may be solved.

The electrode units included in the electrode assembly according to an exemplary embodiment of the present disclosure may be formed through various combinations. Hereinafter, configurations of the electrode units according to an exemplary embodiment of the present disclosure will be described in more detail with reference to the accompanying drawings.

FIG. 1, a side view of an electrode assembly according to an exemplary embodiment of the present disclosure, illustrates a form in which electrode units are stacked in the electrode assembly. As illustrated in FIG. 1, the electrode assembly according to an exemplary embodiment of the present disclosure may include three or more types of electrode units 110, 120 and 130 having different areas, and an electrode laminate formed through a combination of the electrode units 120 having a maximum area may be disposed in the interior of the electrode assembly. The electrode units 120 having a maximum area may be included in the interior of combinations of the electrode units, whereby the center of gravity of the electrode assembly may be disposed in the interior of the combinations of the electrode units, thereby leading to an increase in stability of the electrode assembly.

In this case, the electrode units may be configured to include stacked-type unit cells each including a positive electrode 10 and a negative electrode 20 alternately stacked with a separation film 30 interposed between the positive electrode 10 and the negative electrode 20. In this case, each of the electrode units themselves may form a single layer, and an electrode laminate including two or more electrode units stacked therein may also form a single layer. For example, as illustrated in FIG. 1, the electrode assembly may be formed as follows. The electrode units of a unit cell 105 formed by stacking a single negative electrode and a single positive electrode with a separation film provided therebetween may form a lowermost electrode laminate 130. Then, electrode laminates 110 and 120 formed through a combination of unit cells 101 and 103 and unit cells 102 and 104 may be stacked on the lowermost electrode laminate 130. In this case, each of the unit cells 101 and 103 may include negative electrodes disposed on both sides thereof and a positive electrode disposed between the negative electrodes, with separation films being interposed between the respective electrodes, and each of the unit cells 102 and 104 may include positive electrodes disposed on both sides thereof and a negative electrode disposed between the positive electrodes, with separation films being interposed between the respective electrodes.

Although FIG. 1 illustrates a case in which all of the unit cells configuring the electrode laminates are stacked-type unit cells, the electrode units according to an exemplary embodiment of the present disclosure may be configured as a jelly-roll-type unit cell or a stacked and folded-type unit cell, in addition to a stacked-type unit cell, or may be formed as a combination of these unit cells and a single electrode or formed as a combination of different types of unit cells.

Meanwhile, as illustrated in FIG. 1, the electrode assembly according to an exemplary embodiment of the present disclosure may be a stacked-type electrode assembly formed by stacking the respective electrode laminates 110, 120 and 130, but may be a stacked and folded type electrode assembly or may be a combination of the electrode assemblies. However, types of the electrode assembly are not limited thereto.

Meanwhile, materials for the positive electrode, the negative electrode and the separation film included in the electrode assembly according to an exemplary embodiment of the present disclosure are not particularly limited, and known materials for the positive electrode, the negative electrode and the separation film in the art may be used without any limitation. The positive electrode may be formed by coating a positive electrode current collector formed of aluminum, nickel, copper or an alloy containing at least one of the above-mentioned elements, with a positive electrode active material, such as lithium manganese oxide, lithium cobalt oxide, lithium nickel oxide, lithium iron phosphate, or a compound or mixture containing at least one of the above-described elements.

In addition, the negative electrode may be formed by coating a negative electrode current collector formed of copper, nickel, aluminum or an alloy thereof containing at least one of the above-mentioned elements, with a negative electrode active material, such as a lithium metal, a lithium alloy, carbon, petroleum coke, activated carbon, graphite, a silicon compound, a tin compound, a titanium compound or an alloy thereof containing at least one of the above-mentioned elements.

Further, the separation film may be, for example, a multilayer film having a fine porous structure and formed of polyethylene, polypropylene, or a combination thereof, or may be a polymer film for solid polymer electrolyte or gel type polymer electrolyte, such as polyvinylidene fluoride, polyethylene oxide, polyacrylonitrile or polyvinyliden fluoride hexafluoropropylene copolymer.

In addition, in the electrode assembly according to an exemplary embodiment of the present disclosure, the electrode units may include at least one or more electrode taps. In this case, areas, arrangement positions, and the like, of the electrode taps are not particularly limited. For example, the electrode taps provided in the respective electrode units may have the same area or different areas. According to the related art, electrode taps having the same area and shape are generally used and in this case, the electrode taps may be generally arranged in a line to be stacked. However, since three or more types of electrode units having different areas are included in an exemplary embodiment of the present disclosure, sizes of the electrode taps optimized for the individual electrode units may be varied. Thus, in the electrode assembly according to an exemplary embodiment of the present disclosure, it may be further advantageous to select electrode taps having different areas depending on areas of the electrode units, in order to significantly increase electrical capacity.

In addition, the electrode taps may be disposed in various positions. For example, portions or the entirety of the electrode taps having the same polarity may be disposed to be overlapped with each other. In the case of electrode assemblies according to the related art, in order to facilitate electrical connectivity between electrode taps after the electrode assembly is inserted into a battery case, the entirety of electrode taps having the same polarity may be generally disposed so as to be overlapped with each other. However, in this case, thicknesses of the electrode taps are increased in accordance with an increase in the number of lamination of electrodes, whereby bonding properties between the electrode taps may be degraded. In a case in which only portions of electrode taps are overlapped with each other, rather than the entirety of the electrode taps being overlapped with each other, the above limitations may be considerably reduced.

In particular, in the case of forming an electrode assembly having a plurality of steps with the use of electrode units having various areas, as in the electrode assembly according to an exemplary embodiment of the present disclosure, electrode taps having different areas depending on areas of the electrode units used may be used, and the electrode taps may be stacked such that only portions thereof may be overlapped with each other. The electrode taps are arranged in such a manner to allow for a significant increase in electrical capacity and further, bonding properties between the electrode taps may be improved.

Figure 2:
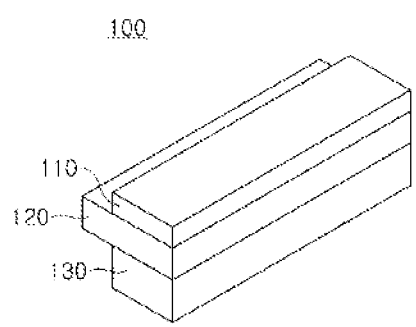
FIGS. 2 to 4 are views illustrating examples of electrode units stacked in the electrode assembly according to an exemplary embodiment of the present disclosure.
Figure 3:
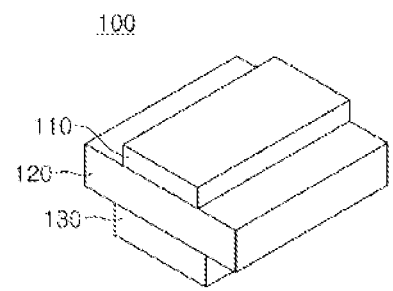
Figure 4:
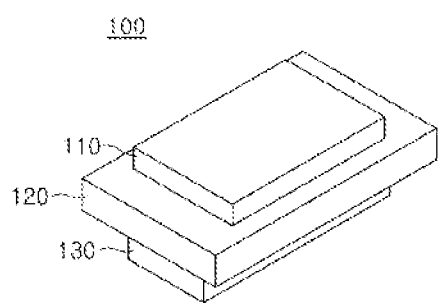

Next, in the electrode assembly according to an exemplary embodiment of the present disclosure, three or more types of electrode units having different areas may be stacked in various arrangements. A method of stacking the electrode units is not particularly limited, but the electrode units may be stacked such that at least one corners of the respective electrode laminates coincide with each other as illustrated in FIGS. 2 and 3. As illustrated in FIG. 4, the electrode units may be stacked such that corners of portions of the electrode laminates are included within surfaces of the electrode assembly having a relatively large area. In this case, the electrode laminates may be stacked such that the centers of gravity thereof coincide with each other or do not coincide with each other.

Meanwhile, in an exemplary embodiment of the present disclosure, shapes of the electrode units forming different electrode laminates may be identical to or different from each other. For example, the electrode units according to an exemplary embodiment of the present disclosure may have quadrangular shapes such as rectangular shapes, square shapes, trapezoidal shapes, parallelogram shapes, diamond shapes or the like. Each of the electrode units may have a quadrangular shape in which at least one corner thereof may be curved or at least one side thereof may also be curved. In addition to these, various shapes of electrode units may be present and such modified examples may be regarded as belonging to the scope of the present disclosure.

Figure 5:
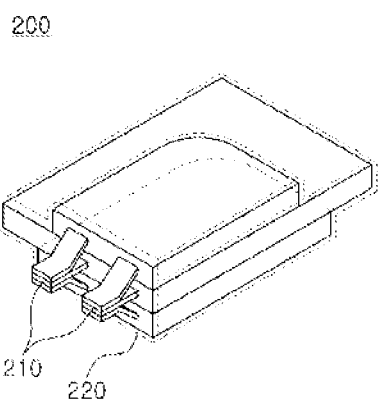
FIG. 5 is a perspective view of a secondary battery according to an exemplary embodiment of the present disclosure.
Figure 6:
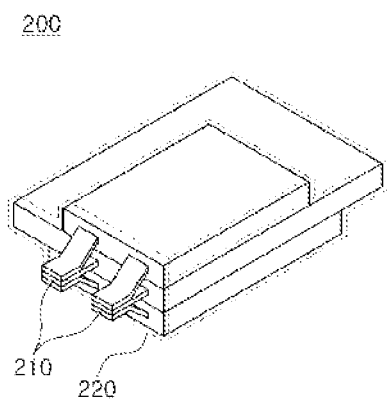
FIG. 6 is a perspective view of a secondary battery according to another exemplary embodiment of the present disclosure.

For example, the electrode assembly according to an exemplary embodiment of the present disclosure may be formed by stacking electrode laminates in which at least one electrode laminate has an electrode surface shape different from that of the remainder electrode laminate, as illustrated in FIG. 5. The electrode assembly according to an exemplary embodiment of the present disclosure may be formed by stacking three or more electrode laminates in which electrodes thereof have the same electrode surface shape but different areas, as illustrated in FIG. 6. The shapes of the electrode units are variously formed as described above, variously shaped battery designs may be implemented. Further, the shape of the electrode assembly may be changed in accordance with a change in a battery receiving space to improve space occupancy. Consequently, an increase in electrical capacity may be promoted.

Meanwhile, an exemplary embodiment of the present disclosure may provide a secondary battery embedded in a battery case. As illustrated in FIGS. 5 and 6, a secondary battery 200 according to an exemplary embodiment of the present disclosure may be formed by embedding the electrode assembly 100 according to the foregoing embodiment of the present disclosure in a battery case 220. In this case, the battery case 220 is not limited, but may be a pouch type case. The pouch type case may be formed of a laminate sheet, and the laminate sheet may be formed of an external resin layer forming an outermost portion thereof, a shield metal layer preventing a foreign material from penetrating therethrough, and an internal resin layer for sealing, but the present disclosure is not limited thereto.

The battery case may have a shape corresponding to that of the electrode assembly. However, it may be unnecessary to completely match a shape and a size of the battery case with those of the electrode assembly. The shape and size of the battery case may be provided within a range in which internal short circuits caused by a phenomenon in which electrode units of the electrode assembly slide may be prevented.

Meanwhile, a lithium ion secondary battery or a lithium ion polymer secondary battery may be manufactured using the electrode assembly provided in an exemplary embodiment of the present disclosure. In addition, a battery package including two or more secondary batteries including the electrode assembly provided according to an exemplary embodiment of the present disclosure may be obtained. Further, a device including at least one secondary battery as described above may be obtained. The device may be a mobile phone, a portable computer, a smartphone, a smartpad, a netbook, a light electric vehicle (LEV), an electric vehicle, a hybrid electric vehicle, a plug-in hybrid electric vehicle, or a power storage device.

When the secondary battery according to an exemplary embodiment of the present disclosure is mounted in the above-described device, system parts of the device may be positioned in an extra space formed due to the structure of the secondary battery according to an exemplary embodiment of the present disclosure. In the case that the secondary battery according to an exemplary embodiment of the present disclosure may be provided such that the electrode assembly itself is formed in a stepped manner, the battery case is formed to match with an electrode shape, and the secondary battery is mounted in a the device, an extra space which is not existed in a prismatic or elliptical battery cell or battery pack of the related art may be generated. When the system parts of the device are equipped in the extra space, the system parts of the device and the battery cell or the battery pack may be smoothly disposed, so that space availability may be improved and the overall thickness or volume of the device may be decreased to realize a slim design.

REFERENCE NUMERAL

10: POSITIVE ELECTRODE
20: NEGATIVE ELECTRODE
30: SEPARATION FILM
100: ELECTRODE ASSEMBLY
101, 102, 103, 104, 105: UNIT CELL
110, 120, 130: ELECTRODE UNIT
200: BATTERY
210: ELECTRODE LEAD PORTION
220: BATTERY CASE

The invention claimed is:

1. An electrode assembly formed by stacking a plurality of electrode units, the electrode assembly comprising: two or more steps formed by stacking three or more types of the electrode units having different areas,
    wherein an array of electrode units having a maximum area among the electrode units is positioned in the interior of the electrode assembly, and electrodes having different polarities face each other at an interface between the electrode units having different areas, and
    wherein, at the interface, an electrode having a relatively large area is disposed as a negative electrode and an electrode having a relatively small area is disposed as a positive electrode.

2. The electrode assembly of claim 1, wherein each of the electrode units is formed of a single electrode, a unit cell including a positive electrode and a negative electrode with a separation film interposed therebetween, or a combination thereof.

3. The electrode assembly of claim 2, wherein the unit cell is manufactured by a jelly-roll method, a stacking method, a stacking and folding method or a lamination and stacking method.

4. The electrode assembly of claim 1, wherein in each of the electrode units, an electrode surface thereof has a quadrangular shape in which at least one corner is curved or at least one side is curved.

5. The electrode assembly of claim 1, wherein at least one of the three or more types of the electrode units has an electrode surface shape different from that of a remainder thereof.

6. A secondary battery comprising the electrode assembly of claim 1, embedded in a battery case.

7. The secondary battery of claim 6, wherein the secondary battery is a lithium ion secondary battery or a lithium ion polymer secondary battery.

8. A battery package comprising two or more secondary batteries of claim 6.

9. A device comprising at least one secondary battery of claim 6.

10. The device of claim 9, wherein the device is a mobile phone, a portable computer, a smartphone, a smartpad, a netbook, a light electric vehicle (LEV), an electric vehicle, a hybrid electric vehicle, a plug-in hybrid electric vehicle, or a power storage device.

* * * * *